United States Patent [19]

Kurita et al.

[11] Patent Number: 4,917,848

[45] Date of Patent: Apr. 17, 1990

[54] PROCESS FOR PRODUCING POLYESTER FIBERS

[75] Inventors: Kazuo Kurita; Youichi Watanabe; Susumu Tate, all of Ootsu, Japan

[73] Assignee: Toyo Boseki Kabushiki Kaisha, Osaka, Japan

[21] Appl. No.: 295,524

[22] Filed: Jan. 10, 1989

[30] Foreign Application Priority Data

Jan. 13, 1988 [JP] Japan ................................. 63-6566

[51] Int. Cl.$^4$ ............................................. D01F 11/08
[52] U.S. Cl. .............................. 264/184; 264/210.7; 264/210.8; 264/211.16; 264/236; 264/347
[58] Field of Search .............. 264/236, 347, 83, 210.3, 264/210.7, 210.8, 211.14, 211.15, 211.17, 184, 211.16

[56] References Cited

U.S. PATENT DOCUMENTS 2,935,372  5/1960  Steuber ................................. 264/83
3,840,632  10/1974  Maxion et al. ...................... 264/236

OTHER PUBLICATIONS

Sen-I-Gakkaishi, vol. 35, No. 8 (1979), pp. 46–50, Kiyotsukuri and Ohigashi, "Structure and Properties of Polyethylene Terephthalate Fiber Post-Polymerized by Heat-Treatment".

Primary Examiner—Hubert C. Lorin
Attorney, Agent, or Firm—Wenderoth, Lind & Ponack

[57] ABSTRACT

Process for producing polyester fibers of high tenacity and high modulus, by melt-spinning a polyester having an intrinsic viscosity of not lower than 0.3, to obtain extruded filaments of low orientation having a birefringence not higher than $10.0 \times 10^{-3}$, post-polymerizing the filaments in a heating medium, and subjecting the filaments to multi-stage drawing in at least two stages.

3 Claims, 1 Drawing Sheet

PROCESS FOR PRODUCING POLYESTER FIBERS

BACKGROUND OF THE INVENTION

The present invention relates a process for producing polyester fibers of high tenacity and high modulus.

At present, polyesters, representative of which is polyethylene terephthalate, are widely used for fibers, films, bottles, plastics, etc. The improvement of mechanical properties and performance of these shaped articles is strongly desired in their respective fields. It has been known for a long time, as stated by H. F. Mark, "Man-made Fibers" (Science and Technology), Vol. 3, page 12 (1968), Interscience Publishers, that the mechanical properties of a polymer are closely related to the polymer's own molecular weight. The present invention relates to a process for giving polyesters an ultrahigh molecular weight by a new means called polymerization in a heating medium, and for obtaining fibers of high tenacity and high modulus.

In general, polyester fibers are produced by first obtaining glycol ester and/or its low molecular weight polymer by direct esterification of an aromatic dicarboxylic acid and glycol or by ester interchange of an aromatic dicarboxylic acid alkyl ester and glycol, and then obtaining a polycondensation product by heating them with stirring under a high vacuum, followed by melt-spinning of the polycondensation product and drawing the resulting filaments.

On the other hand, in Sen-i-Gakkaishi, Vol. 35, No. 8, T-328 (1979), an attempt is disclosesd, wherein drawn polyethylene terephthalate filaments are heat-treated in filament form to give them a high molecular weight by solid state polymerization. However, both tenacity and modulus are lowered with the heat treatment, and therefore such an attempt is not related to the attempt of obtaining fibers of high tenacity and high modulus aimed at in the present invention.

The method of polycondensation by heating with stirring under a high vacuum is widely adopted industrially at present. But this method requires a vacuum apparatus for maintaining a high vacuum, and a strong power for stirring a highly viscous substance, and consequently the apparatus has to be complicated and a high cost is necessary. In the use for industrial materials in particular, polymers of a higher degree of polymerization are required, and in general, after the melt-polymerization as mentioned above, the resulting polymer is made into chips, and then the chips are subjected to solid state polymerization by heating for a long time in an inert gas or under vacuum, thereby to obtain a polyester of a high degree of polymerization. However, by this method, there is a limitation in the degree of polymerization of the resulting polyester. We therefore searched for a polyester of a higher degree of polymerization. As a result, we have succeeded in obtaining a polyester of an ultrahigh molecular weight which has not been obtained by the conventional methods, by a new method called polymerization in a heating medium. As used herein the term "polymerization in a heating medium" means polycondensation of oligoester or polyester in a heating medium by heating with stirring while blowing an inert gas into the medium.

Although it is possible by this polymerization method in a heating medium to obtain an ultrahigh molecular weight polyester that has never been obtained, the viscosity of the resulting polymer is too high and accordingly it was extremely difficult to give fibers high tenacity and high modulus by adopting the conventional melt-spinning method.

SUMMARY OF THE INVENTION

As a result of our eager study to solve the above-mentioned problems, we have finally accomplished the present invention.

The present invention is a process for producing polyester fibers of high tenacity and high modulus characterized in that extruded filaments of low orientation having a birefringence not higher than $10.0 \times 10^{-3}$ obtained by melt-spinning a polyester having an intrinsic viscosity (measured in a mixed solvent of p-chlorophenol-tetrachloro=3/1 at 30° C.) not lower than 0.3, are post-polymerized in a heating medium, and are then subjected to multi-stage drawing of at least two stages.

BRIEF DESCRIPTION OF THE DRAWINGS

Each of the FIGS. 1 and 2 is a schematic view of a polymerization apparatus which may be used in carrying out the method of this invention.

DETAILED DESCRIPTION OF THE INVENTION

Figure 1:
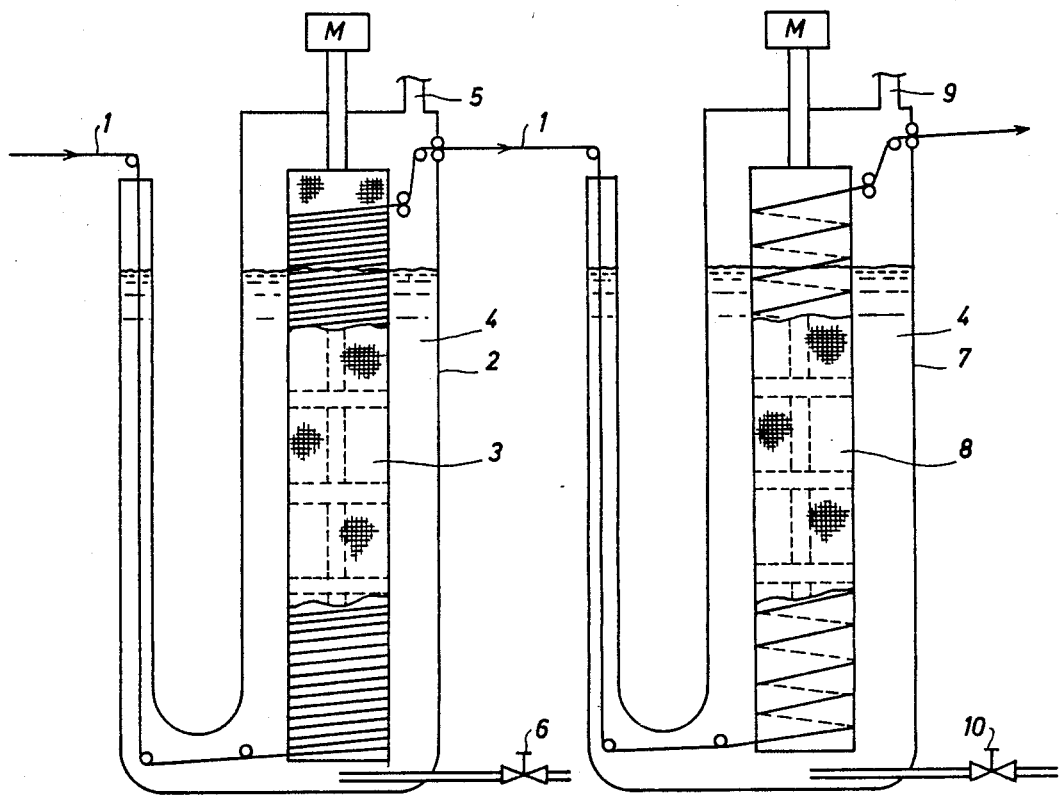

In the present invention, the term "heating medium" means an organic compound which is thermally stable and can be handled as a fluid within the reaction temperatures, and is a compound selected from aromatic hydrocarbons, aliphatic hydrocarbons and alicyclic hydrocarbons or a mixture of two or more of these compounds.

To give concrete examples, the are paraffine, alkyl diphenyl, hydrogenated terphenyl, hydrogenated biphenyl, alkyl naphthalene, cyclohexyl biphenyl, etc. The heating media which are especially favorable in the present invention are those which swell the polyester but do not dissolve it. For example, one or two or more of the compounds represented by the following general formulas (I) and (II) are favorable. As concrete examples, there may be mentioned triethyl biphenyl, tetraethyl biphenyl, dimethyl biphenyl, trimethyl biphenyl, ethyl biphenyl, tripropyl, biphenyl, diethyl biphenyl, cyclohexyl benzene, hydrogenated triphenyl, hydrogenated biphenyl, hydrogenated terphenyl, etc. These compounds may be used as a mixture with another heating medium such as paraffine which does not swell the polyester. The above-mentioned heating media may be used after purification by known methods such as distillation.

$$A^1\text{-}A^2\text{-}\ldots\text{-}A^l \qquad (I)$$

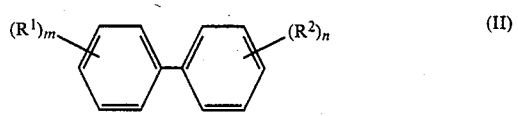

(II)

wherein $A^1$ and $A^l$ are each phenyl group or a cycloalkyl group having 5 to 20 carbon atoms. $A^2$ to $A^{l-1}$ are each a phenylene group or a cycloalkylene group having 5 to 20 carbon atoms, $R^1$ and $R^2$ are each a hydrogen atom or an alkyl group having 1 to 20 carbon atoms, $l$ is an integer from 2 to 5 and n and m are each an integer from 0 to 5.

As the organic dicarboxylic acids or ester-forming derivatives thereof used in the present invention, there may be mentioned aromatic dicarboxylic acids having two carboxyl groups directly connected to the benzene ring or naphthalene ring, such as terephthalic acid, isophthalic acid, 5-sodium sulfoisophthalate, 2,6-naphthalene dicarboxylic acid, etc.; aliphatic dicarboxylic acids such as adipic acid, sebasic acid, etc.; p-β-oxyethoxybenzoic acid, 4,4'-dicarboxyl diphenyl, 4,4'-dicarboxyl benzophenone, bis(4-carboxyl phenyl)ethane, or alkyl (such as methyl, ethyl, propyl) esters thereof. As the glycols, there may be mentioned alkylene glycols having 2 to 6 carbon atoms, such as ethylene glycol, propylene glycol, butane diol, neopentyl glycol; diethylene glycol, cyclohexane dimethanol, ethylene oxide addition product of bisphenol A, etc.

Incidentally, the intrinsic viscosity in the present invention is the value measured by the following method: the intrinsic viscosity measured with the mixed solvent of p-chlorophenol/tetrachloroethane (3/1) at 30° C. is converted to the value measured with phenol/tetrachloroethane (6/4) by the following formula:

$$[\eta]_{60/40\ PHENOL/TCE} = 0.8352 \times [\eta]_{3/1\ PCE/TCE} + 0.005$$

In the process of the present invention, a dicarboxylic acid or an ester-forming derivative thereof and a glycol are subjected to esterification reaction or ester interchange reaction in the usual way, and then the resulting product is subjected to the conventional melt-polymerization or to polycondensation in the above-mentioned heating medium, whereby a polyester having an intrinsic viscosity not lower than 0.3 is obtained.

If the intrinsic viscosity is less than 0.3, the spinnability upon producing low orientation filaments by melt-spinning is lowered, and therefore such an intrinsic viscosity is undesirable.

The upper limit of the intrinsic viscosity is not particularly limited. But an intrinsic viscosity not higher than 1.2 is especially favorable, because, with such a viscosity, there is no particular necessity for specifying the spinning apparatus.

Therefore in the present invention, it is favorable to vacuum-dry a polyester of an intrinsic viscosity of from 0.3 to 1.2, melt-spin the polyester, and take up the resulting filaments so that the birefringence ($\Delta n$) of the polyester will become not higher than 0.010.

When the $\Delta n$ exceeds 0.010, the polymerization speed in the heating medium is lowered, thereby the time required for post-polymerization is prolonged and the productivity is lowered, and therefore such a $\Delta n$ is not desirable. Hence, at a value not higher than 0.010, the lower the $\Delta n$, the shorter will be the time for obtaining the effect of elevating the degree of post-polymerization. However, at a value lower than 0.001, the spinning stress of thread line will become too low so that the spinning operation will tend to be unstable, and therefore such a value is not so favorable.

The above-mentioned polyester undrawn filaments are then introduced into the above-mentioned heating medium, and while an inert gas such as nitrogen gas, helium gas, or carbonic acid gas, etc. is blown into it, the heating medium is maintained at a temperature of from 100° C. to 250° C. to advance the polycondensation to a further extent. The filaments are first caused to stay there at a temperature of from 100° C. to 240° C., especially from 180° to 220° C., for 1 to 60 hours, especially 3 to 20 hours, and then at a temperature of from 150° C. to 250° C., especially from 210° C. to 238° C., for 1 to 24 hours, especially 1 to 10 hours.

As the reaction catalysts for the polycondensation reaction to obtain a polyester of intrinsic viscosity of 0.3 or for the polycondensation in the heating medium, of the polyester after being formed into filaments, there may be used conventional catalysts known per se in the production of polyesters, such as compounds of antimony, titanium, germanium, cobalt, manganese, tungsten, tin, etc. In the present invention, however, antimony compounds, tungsten compounds or tin compounds which are soluble in polyesters are favorable. For example, there may be mentioned $Sb_2O_3$, tungstic acid or salts thereof, stannous acetate, stannous bromide, stannic bromide, stannous chloride, stannic chloride, etc.

The shaped articles obtained by the above-mentioned process have an ultrahigh molecular weight of an intrinsic viscosity of from about 1.2 to 10, and since they are obtained as already shaped articles, it is possible to obtain the final product of fibers only by further drawing treatment.

When the intrinsic viscosity (IV) of filaments is less than 1.2, such filaments can be easily produced by the usual melt-spinning, and therefore in such a case there is no merit of applying the process of the present invention.

By the post-polymerization of filaments while moving the filaments in the heating medium, the post-polymerization step of this process can be continuously connected to the spinning step or the drawing step, whereby it is possible to rationalize the process steps, and hence this post-polymerization is particularly favorable.

Furthermore, when the post-polymerization step is carried out by batchwise treatment, the filaments are susceptible to mutual fusion or damage, and also it becomes difficult to give the filaments high tenacity and high modulus in the succeeding drawing step.

However, upon moving the filaments in the heating medium, the filaments are at a high temperature near the melting point and also are of low orientation, and therefore it is extremely difficult to move the filaments by tension as motive power. As a result of our study, it has become apparent that when the filaments are placed on a supporting structure and caused to travel on it, no filament breakage occurs, and stable post-polymerization is possible.

As the supporting structures, it is favorable that they have the shape of a belt or conveyor, and porous ones are especially effective. The use of these is therefore especially desirable.

The high intrinsic viscosity polyester filaments post-polymerized in the heating medium obtained by the above-mentioned process, are in a swollen state by the heating medium, and therefore stable high ratio drawing at room temperature is possible. In order to realize high tenacity and high modulus of the final fibers, the first stage drawing is conducted at a temperature above 0° C. and below the melt-down temperature of the filaments in a swollen state by the heating medium. If the temperature is less than 0° C., the drawing apparatus is required to be equipped with a special cooling apparatus, which will increase the cost of producing the fibers. Since tension is applied at the time of drawing, it is possible to draw the filaments at a temperature above the melt-down temperature of the filaments, but when the filaments are drawn at a temperature above the melt-down temperature, not only the tenacity and modulus of the drawn filaments will be low but also a sufficient draw ratio will not be obtained in the second and further stage drawing which are conducted subsequently to the first stage drawing, thereby resulting in an inferior tenacity of the final fibers.

For the realization of the high tenacity and high modulus of polyester fibers, at which the present invention aims, it is desirable to conduct multi-stage drawing consisting of at least two stages or more.

As the temperature of the second stage drawing, a temperature above the first stage drawing temperature +20° C. and below the melting point of the polyester, is desirable. If the drawing temperature is less than the first stage drawing temperature +20° C. the tension at the second stage drawing will rise suddenly, and this results in an insufficient draw ratio. At a temperature exceeding the melting point, flow draw takes place, and melt-down of the filaments or a drop of tenacity and modulus will be caused.

The drawn filaments after the second stage drawing already have a sufficiently high tenacity and high modulus. However, in order to further improve the high tenacity and high modulus of the filaments, it is advantageous for the filaments of the present invention to be given further drawing stages.

Thus, by conducting high ratio drawing of at least more than 6 times, preferably more than 8 times, polyester fibers of high tenacity and high modulus can be obtained.

In this invention, the term "melt-down" temperature of filaments swollen by the heating medium" means a temperature at which the filaments melt-down when the filaments, under a stationary load of 0.05 g/d, are passed through a heating oven of a length of 10 cm.

The action by which high tenacity and high modulus polyester fibers are obtained in the present invention is supposed to be as follows:

The tenacity and modulus of shaped articles are closely related to the molecular weight of the polymer. In the process of the production of shaped articles in the present invention, the polymer is previously shaped into filament form and is further polymerized in the heating medium, whereby ethylene glycol is efficiently removed. Moreover, unlike the polymerization in the form of chips, since there is no problem of fusion, an extremely high degree of polymerization can be obtained. Furthermore, since there is no molecular weight decrease as occurs in the conventional melt shaping, it is supposed that polyester fibers of high tenacity and high modulus can be obtained.

Since undrawn filaments of high degree of polymerization generally have a large number of places of molecular chain entanglement, a high draw ratio can not be obtained. But in the undrawn filaments of the present invention, the filaments are already swollen by the post-polymerization in the heating medium and hence have high drawability. We support that this might act particularly effectively in giving high tenacity and high modulus to the polyester fibers.

Figure 2:
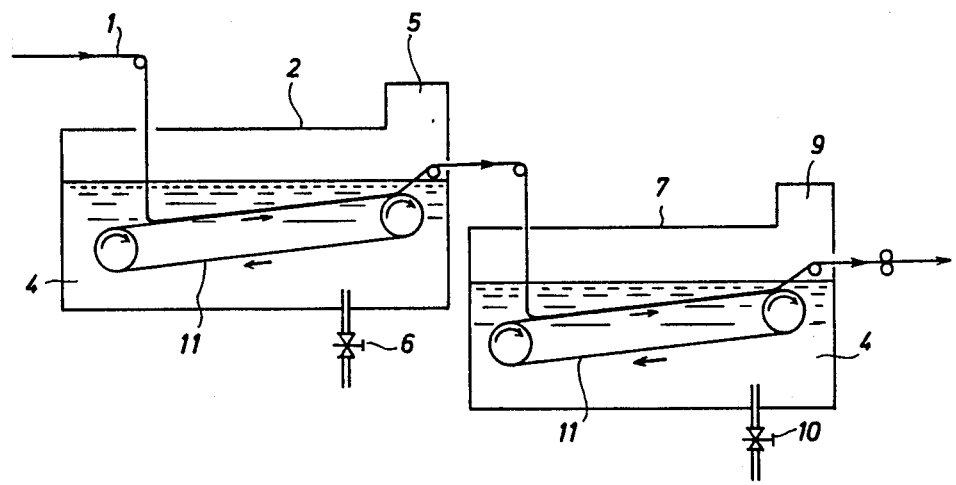

The invention will be further explained by the following Examples which refer partly to the accompanying drawings wherein each of FIGS. 1 and 2 is a schematic view of a polymerization apparatus which may be used in carrying out the method of this invention.

EXAMPLE 1

Polyethylene terephthalate (containing as the catalyst, 0.045 mol % antimony for terephthalic acid, and having an intrinsic viscosity of 1.00) produced in the usual way was spun through a spinneret (spinneret hole diameter: 0.3 mm, hole length: 1.2 mm, number of holes: 24) at a spinneret temperature of 300° C., and with an extrusion quantity of 18 g/min. The resulting filaments were wound up at a winding speed of 110 m/min to obtain undrawn filaments (1370 denier/18 filaments) having a birefringence ($\Delta n$) of $2.1 \times 10^{-3}$, and an intrinsic viscosity of 0.85. The glass transition temperature of the undrawn filaments was 73° C.

In the following, an explanation will be given by referring to the drawings:

FIG. 1 is a partly broken elevation showing an example of the reaction vessels used in this example of practice.

First, the polyester undrawn filament yarn 1 obtained by the above-mentioned method was wound at intervals of 3 mm around 30-mesh stainless steel A drum 3 having a diameter of 40 cm and a height of 180 cm installed in A reaction vessel 2 of a diameter of 50 cm and a height of 200 cm. Into the A reaction vessel 2, two hundred liters of hydrogenated triphenyl as the heating medium 4 was introduced through heating medium inlet 5. While nitrogen gas was blown into the A reaction vessel 2 through nitrogen gas quantity controlling valve 6 at a quantity of 30 Kl/hr, the temperature of the heating medium 4 was maintained at 220° C. While the A drum 3 was rotated at 0.5 rpm so that the residence time of the undrawn filament yarn 1 would be 20 hours, the undrawn filament yarn 1 was introduced continuously into B reaction vessel 7. The undrawn filament yarn 1 was wound at intervals of 18 mm around B drum 8 installed in B reaction vessel 7. Two hundred liters of hydrogenated triphenyl as the heating medium 4 was introduced into the B reaction vessel 7 through heating medium inlet 9. While nitrogen gas was blown therein through nitrogen gas quantity controlling valve 10, at a quantity of 30 kl/hr, the temperature of the heating medium was maintained at 235° C. While the B drum 8 was rotated at 0.5 rpm so that the residence time of the undrawn filament yarn in the reaction vessel 7 would be 8 hours, the undrawn filament yarn was continuously taken out of the B reaction vessel 7, and was wound up around a winding roller. After the wound filament yarn was subjected to the first stage drawing of 5 time at room temperature (22° C.), it was drawn 1.3 times with a drawing stress of 2 g/d at 185° C., and was further drawn 1.3 times with a drawing stress of 3 g/d at 200° C., with the result that the total drawing ratio was 8.45 times.

The thus-obtained drawn fibers had a denier of 143.5, a tenacity of 13.85 g/d, an initial modulus of 253.1 g/d, the intrinsic viscosity of the fibers being 3.7.

However, in carrying out this example, there occurred troubles of filament breakage at the outlets of the A and B reaction vessels.

EXAMPLE 2

The undrawn filament yarn of Example 1 was polymerized in the the heating medium in the apparatus shown in FIG. 1 under the same conditions as in Example 1 except that the filament yarn was wound around 100-mesh stainless steel wire net drums instead of the drums of the A and B reaction vessels and the wire net drums were placed in a stationary state. Hence the filament yarn was not moved and treated in a batchwise operation. Thereafter, the filament yarn was drawn under the same conditions as in Example 1.

The drawn filament yarn had a denier of 151.2, a tenacity of 11.47 g/d, an elongation of 9.4%, an initial modulus of 236.8 g/d, the intrinsic viscosity of the fibers being 3.85.

EXAMPLE 3

Using the same undrawn filament yarn as in Example 1, and using the apparatus shown in FIG. 2, polymerization in the heating medium was conducted. Undrawn filament yarn 1 was supplied to A reaction vessel 2 filled with hydrogenated triphenyl 4 of 220° C., and was received on a net conveyor 11 driven at a speed of 0.00083 m/min. After 20 hours, the filament yarn was taken out of the A reaction vessel, and was subsequently supplied to B reaction vessel 7 filled with hydrogenated triphenyl 4 of 235° C. Likewise, the filament yarn was received on a net conveyor 11 driven at a speed of 0.00083 m/min. After about 8 hours, it was taken out of B reaction vessel, was cooled to room temperature and was wound up. During the period of this experiment, nitrogen gas was blown into the A and B reaction vessels through nitrogen gas quantity controlling valves 6 and 10, in a quantity of 20 kl/hr, respectively. During the period of the experiment, filament breakage did not occur.

Measurement was effected for the physical properties of the drawn fibers obtained by drawing the wound polymerized yarn. The drawing conditions and the physical properties of the drawn yarn are shown in Table 1. Incidentally, the melt-down temperature of the polymerized yarn was 200° C.

TABLE 1

| | | Example 3 a | Example 3 b | Example 3 c | Example 3 d (comparison) |
|---|---|---|---|---|---|
| 1st stage drawing | Temp. °C. | 25 | 80 | 120 | 205 |
| | Draw Times | 5.0 | 5.5 | 5.9 | 7.5 |
| 2nd stage drawing | Temp. °C. | 160 | 160 | 165 | 230 |
| | Draw times | 1.7 | 1.65 | 1.65 | 1.05 |
| 3rd stage drawing | Temp. °C. | 245 | 245 | 245 | 245 |
| | Draw times | 1.1 | 1.07 | 1.07 | 1.03 |
| Total draw ratio | | 9.35 | 9.71 | 10.42 | 8.11 |
| Denier | | 135.1 | 131.0 | 123.2 | 154.8 |
| Tenacity g/d | | 12.69 | 13.82 | 15.11 | 9.4 |
| Modulus g/d | | 265.6 | 268.3 | 283.1 | 123.7 |

COMPARATIVE EXAMPLE 1

Into an autoclave of a capacity of 15 liters, equipped with an inert gas inlet, a heating medium inlet and outlet, and a stirring opening, 1500 g polyethylene terephthalate of a grain diameter of 50 μm to 100 μm (containing as the catalyst, 0.045 mol % antimony for terephthalic acid, and having an intrinsic viscosity of 0.60), and 8 liters of hydrogenated triphenyl as the heating medium were introduced. While nitrogen gas was blown therein at a quantity of 1 Kl/hr, the temperature was raised, and the heating medium was heated under stirring at 220° C. for 20 hours and at 235° C. for 6 hours. As a result, the polymer after the end of polymerization fused together to form grains of several hundred μm to several mm. After washing the polymer with acetone, and drying it under vacuum the intrinsic viscosity was measured, but it reached only 2.2.

It has been believed that it is impossible to give high tenacity and high modulus to polyester fibers by the conventional spinning and drawing method because the viscosity of ultrahigh molecular weight polyesters is too high. The present invention has succeeded in solving this problem. Without employing complicated spinning and drawing conditions and apparatuses, the present invention now makes it possible to stably provide polyester fibers of higher quality, higher tenacity and higher modulus in comparison with the conventional products. The present invention therefore contributes greatly to the industrial world.

What is claimed is:

1. A process for producing polyester fibers of high tenacity and high modulus, which comprises melt-spinning a polyester having an intrinsic viscosity, measured in a mixed solvent of p-chlorophenol/tetrachlorethane=3/1 at 30° C., of not lower than 0.3, to obtain extruded filaments of low orientation having a birefringence not higher than $10.0 \times 10^{-3}$, post-polymerizing the filaments in a heating medium at a temperature of 100° to 250° C., and subjecting the post-polymerized filaments to multi-stage drawing at a total draw ratio of more than 6 times in at least two stages, wherein the first stage drawing is at a temperature below the melt-down temperature of the filaments in a swollen state by the heating medium and above 0° C., and the second stage drawing is at a temperature above the drawing temperature of the first stage drawing +20° C. and below the melting point of the polyester.

2. The process as claimed in claim 1, wherein the heating medium is an aromatic hydrocarbon, an aliphatic hydrocarbon, an alicyclic hydrocarbon or a mixture of two or more thereof.

3. The process as claimed in claim 1 wherein the heating medium is composed of one or more of the compounds represented by the general formulas (I) and (II):

$$A^1\text{-}A^2\text{-}\ldots\text{-}A^l \qquad (I)$$

$$(R^1)_m \qquad (R^2)_n \qquad (II)$$

wherein A and $A^l$ are each a phenyl group or a cycloalkyl group having 5 to 20 carbon atoms, $A^2$ to $A^{l-1}$ are each a phenylene group or a cycloalkylene group having 5 to 20 carbon atoms, $R^1$ and $R^2$ are each a hydrogen atom or an alkyl group having 1 to 20 carbon atoms, l is an integer of from 2 to 5, and n and m are each an integer of from 0 to 5.

* * * * *